(12) United States Patent
Zhao et al.

(10) Patent No.: US 11,708,268 B2
(45) Date of Patent: Jul. 25, 2023

(54) SP²-SP³ HYBRID CRYSTALLINE BORON NITRIDE AND ITS PREPARATION PROCESS

(71) Applicant: YANSHAN UNIVERSITY, Qinhuangdao (CN)

(72) Inventors: Zhisheng Zhao, Qinhuangdao (CN); Kun Luo, Qinhuangdao (CN); Lei Sun, Qinhuangdao (CN); Bing Liu, Qinhuangdao (CN); Wentao Hu, Qinhuangdao (CN); Julong He, Qinhuangdao (CN); Dongli Yu, Qinhuangdao (CN); Yongjun Tian, Qinhuangdao (CN); Bo Xu, Qinhuangdao (CN); Zhongyuan Liu, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 358 days.

(21) Appl. No.: 17/039,194

(22) Filed: Sep. 30, 2020

(65) Prior Publication Data
US 2021/0323822 A1    Oct. 21, 2021

(30) Foreign Application Priority Data

Apr. 17, 2020 (CN) .......................... 202010305181.4

(51) Int. Cl.
*C01B 21/064* (2006.01)
(52) U.S. Cl.
CPC ...... *C01B 21/0648* (2013.01); *C01P 2002/01* (2013.01); *C01P 2002/76* (2013.01); *C01P 2002/77* (2013.01)

(58) Field of Classification Search
None
See application file for complete search history.

(56) References Cited

FOREIGN PATENT DOCUMENTS

| CN | 101362591 A | 2/2009 |
|----|-------------|--------|
| CN | 110330006 A | 10/2019 |

(Continued)

OTHER PUBLICATIONS

The first Office Action issued by the Japanese Patent Office dated Nov. 30, 2021 for the Japanese Patent Application No. 2020-180784.

(Continued)

*Primary Examiner* — Sheng H Davis
(74) *Attorney, Agent, or Firm* — Maschoff Brennan; Brent A. Johnson; Yuefen Zhou (57) ABSTRACT

The present disclosure relates to a novel sp²-sp³ hybrid crystalline boron nitride and its preparation process. A novel sp²-sp³ hybrid crystalline boron nitride allotrope, named Gradia BN, is synthesized using sp² or sp³ hybridized boron nitride as raw materials under high-temperature and high-pressure. The basic structural units of Gradia BN are composed of sp² hybridized graphite-like structural units and sp³ hybridized diamond-like structural units. Gradia BN disclosed in the present disclosure is a class of new sp²-sp³ hybrid boron nitride allotrope, whose crystal structure can vary with the widths and/or crystallographic orientation relationships of internal sp² and/or sp³ structural units, and may have variable physical properties.

12 Claims, 5 Drawing Sheets

(56) References Cited

FOREIGN PATENT DOCUMENTS

| JP | 2005097098 A | 4/2005 |
|---|---|---|
| JP | 2011168848 A | 9/2011 |
| JP | 2019172486 A | 10/2019 |

OTHER PUBLICATIONS

The Notice of Rejection Decision issued by the Japanese Patent Office dated May 31, 2022 for the Japanese Patent Application No. 2020-180784.
The first Office Action issued by the European Patent Office dated Jun. 23, 2022 for the European Patent Application No. 20206360.8.
The second Office Action issued by the China National Intellectual Property Administration (CNIPA) dated Sep. 29, 2022 for the Chinese Patent Application No. 202010305181.4.
Extended European Search Report for European Patent Application No. 20206360.8, dated Feb. 5, 2021.
Lv, M. et al., Electron energy loss spectroscopy analysis for cubic boron nitride single crystals transition mechanism in Li3N-BN system, Materials Letters, 242, 75-78, Jan. 2019.
Xiong, M. et al., Pressure-induced boron nitride nanotube derivatives: 3D metastable allotropes, Journal of Applied Physics, 121, 165106-1-165106-8, Apr. 2017.
Petrescu, M.I. et al., Structure and Properties Modifications in Boron Nitride. Part I: Direct Polymorphic Transformations Mechanisms, U.P.B. Science Bulletin, Series B, vol. 69, No. 1, 35-42, Jan. 2007.
Rafaja, D., et al., Synthesis, microstructure and hardness of bulk ultrahard BN nanocomposites, Journal of Materials Research, vol. 23, No. 4, 981-993, Apr. 2008.
Xiong, M. et al., Three metallic BN polymorphs: 1D multi-threaded conduction in 3D network, Physical Chemistry Chemical Physics, 22(2), 489-496.
Shang, J. et al., Three-dimensional hexagonal boron nitride foam containing both sp2 and sp3 hybridized bonds, Materials Chemistry and Physics, 217, 5-10, Sep. 2018.
The first Office Action issued by the China National Intellectual Property Administration (CNIPA) dated Mar. 29, 2022 for the Chinese Patent Application No. 202010305181.4.
Xu et al., Fine Structures in Growth Interface Layer of Cubic Boron Nitride Single Crystal, Journal of Synthetic Crystals, 44(4), 879-884, Apr. 2015, Abstract.
Tu, Cubic boron nitride—the best material for ferrous metals and their alloys, China Academic Journal Electronic Publishing House, p. 15, http://www.cnki.net, Abstract.
Wikipedia, "Allotropes of carbon" (https://en.wikipedia.org/wiki/Allotropes_of_carbon).
Wikipedia, "Diamond" (https://en.wikipedia.org/wiki/Diamond).
ScienceDirect Topics, Graphite, "Polymer-graphene composite in aerospace engineering" (https://www.sciencedirectcom/sciencefarticle/pii/B9780128216392000001X) (included); also in Das P, et al., Polymer-graphene composite in aerospace engineering, In Polymer Nanocomposites Containing Graphene, pp. 683-711, Jan. 2022. Woodhead Publishing.
ScienceDirect Topics, Coherent Interface, "Surfaces, Grain Boundaries and Interfaces" (https://www.sciencedirect.com/science/article/pii/B9780080982045000109) (included); also in Smallman Re, et al., Chapter 10-Surfaces, grain boundaries and interfaces, Modern physical metallurgy, Eighth Edition edn. Butterworth-Heinemann, Oxford. 2014:415-42.
ScienceDirect Topics, Solid-Solid Interface, "Charge transfer through interfaces in metal-ion intercalation systems" (https://www.sciencedirect.com/science/article/pii/B9780128231449000546) (included); also in Aksyonov Da, et al., "Charge transfer through interfaces in metal-ion intercalation systems", 2021.

SP²-SP³ HYBRID CRYSTALLINE BORON NITRIDE AND ITS PREPARATION PROCESS

CROSS-REFERENCE TO RELATED APPLICATIONS

The present application claims priority to Chinese Patent Application No. 202010305181.4 filed on Apr. 17, 2020, the disclosure of which is incorporated by reference herein in its entirety.

TECHNICAL FIELD

The present disclosure belongs to the technical field of inorganic materials and in particular relates to a novel crystalline boron nitride and its preparation process.

BACKGROUND

The chemical formula of boron nitride is BN, which is a compound composed of boron and nitrogen elements and has excellent physical and chemical properties. Like carbon, BN can form many allotropes, which is due to the flexibility to form $sp^2$ and $sp^3$ hybridization. The $sp^2$ hybridization refers to a hybridization mode that occurs among one 2s orbital and two 2p orbitals within the same electron layer of an atom. The $sp^3$ hybridization refers to a hybridization mode that occurs among one 2s orbital and three 2p orbitals within the same electron layer of an atom. Hexagonal boron nitride (hBN) with graphite like structure is the most stable and soft phase in boron nitride polymorphs, and thus is often used as an additive in lubricants and cosmetics. In contrast, cubic boron nitride (cBN), which has sphalerite structure similar to diamond, is a kind of superhard material. Its hardness is next to diamond, but its chemical and thermal stability is better than diamond. So, cBN is often used to process metal materials, such as iron-based and titanium-based materials.

In addition to the widely used hBN and cBN, some other configurations of BN have also been found. The crystalline structure and configurations of BN can be classified according to the hybridization mode of the B-N bond. Usually, $sp^2$ hybridized boron nitride has layered structure and includes hBN (AAA stacking mode), rBN (ABC stacking mode), pBN and tBN with disordered structure, oBN with onion structure, BN monolayer or nanomesh with graphene like structure and BN nanotubes with carbon nanotubes like structure. At present, there are two kinds of known $sp^3$ hybridized BN, including sphalerite cBN and wurtzite wBN.

BN of $sp^2$ hybridization and BN of $sp^3$ hybridization exhibit distinct physical properties. For example, the $sp^2$ bond extends along a plane and has certain flexibility, while the $sp^3$ bond extends along a three-dimensional space and has strong rigidity. Therefore, it is desirable to obtain boron nitride materials with both $sp^2$ hybridization and $sp^3$ hybridization, which are expected to play the characteristics of different hybridization modes and achieve boron nitride materials with marvelous functional combinations. It has been reported that a small amount of $sp^3$ bond components were found in the amorphous boron nitride films deposited by chemical vapor deposition (R. Zedlitz, M. Heintze, M. B. Schubert, Properties of amorphous born nitride thin films [J]. Journal of Non-crystalline Solids, 1996, 198: 403-406). In addition, some purely theoretically predicted $sp^2$-$sp^3$ hybrid crystalline boron nitride allotropes have been reported in the literature (Xiong Mei, Luo Kun, et al., Hard three-dimensional BN framework with one dimensional symmetry [J]. Journal of Alloys and Compounds, 2018, 731 (15): 364-368), but these predicted $sp^2$-$sp^3$ hybrid crystalline boron nitrides have not yet been confirmed by experiments. In a word, up to now, there has been no $sp^2$-$sp^3$ hybrid crystalline boron nitride allotrope practically found.

SUMMARY

An object of the present disclosure is to provide a novel $sp^2$-$sp^3$ hybrid crystalline boron nitride and its preparation process.

In one aspect, the present disclosure provides an $sp^2$-$sp^3$ hybrid crystalline boron nitride, wherein its basic structural unit is composed of $sp^2$ hybridized graphite-like structural unit and $sp^3$ hybridized diamond-like structural unit, and the two types of units are connected via a coherent interface. In the context of the present disclosure, such an $sp^2$-$sp^3$ hybrid crystalline boron nitride is also named "Gradia boron nitride" or "Gradia BN", which name is taken from the first three letters of graphite and the first three letters of diamond.

In another aspect, the present disclosure provides a process for the preparation of the $sp^2$-$sp^3$ hybrid crystalline boron nitride, comprising subjecting a boron nitride material to high-temperature and high-pressure treatment.

With the above technical solutions, the following technical effects may be achieved:

The present disclosure may make use of ordinary or commercially available $sp^2$ hybridized boron nitride materials or $sp^3$ hybridized boron nitride materials as raw materials, and has less requirements for size and purity of the raw materials. As the present disclosure has no special requirements for purity of the $sp^2$ or $sp^3$ boron nitride raw materials used, the $sp^2$ or $sp^3$ boron nitride materials may comprise other elements than boron (B) and nitrogen (N) as long as they contain a certain proportion of $sp^2$ or $sp^3$ hybridized boron nitride and the impurities do not affect the structure of Gradia BN. The impurity element may be silicon (Si), oxygen (O), sulphur (S), hydrogen (H), and the like. The raw materials as used are cheap and easily available.

A novel $sp^2$-$sp^3$ hybrid crystalline boron nitride, i.e. Gradia BN, is prepared by the preparation process of the present disclosure. The novel $sp^2$-$sp^3$ hybrid crystalline boron nitride has a crystal structure distinct from other crystalline boron nitrides in that its basic structural units are composed of $sp^2$ hybridized graphite-like structural units and $sp^3$ hybridized diamond-like structural units, and thus it exhibits unique properties. For example, Gradia BN can have conductivity and excellent mechanical properties, such as super hardness, high toughness and so on. In addition, the crystal structure of Gradia BN can vary with the widths and/or crystallographic orientation relationships of internal $sp^2$ and $sp^3$ structural units, which can be controlled by e.g. changing the raw materials as used and adjusting the synthesis pressure and temperature. Therefore, it is possible to adjust the physical properties such as optical, electrical, and mechanical properties of Gradia BN and to apply them in various fields with broad prospects.

The $sp^2$-$sp^3$ hybrid crystalline boron nitride, i.e. Gradia BN, as prepared in accordance with the present disclosure has a density lower than cBN. Therefore, the volume shrinkage during the high-pressure phase transition process is relatively small, which is beneficial for the formation of a block material with good formability.

The high-temperature high-pressure equipment used in the present disclosure is currently widely used, and has the advantages of simplicity of operation and ease of controlling synthesis parameters. At the same time, the raw materials used are abundant and inexpensive. Thus, the novel $sp^2$-$sp^3$ hybrid crystalline boron nitride materials may be produced in an industrial scale and their crystal structures can be adjusted to achieve regulation of performances.

DETAILED DESCRIPTION

The present inventions will be further described in detail below with reference to the drawings and specific embodiments.

The present disclosure provides an $sp^2$-$sp^3$ hybrid crystalline boron nitride (named Gradia BN), wherein its basic structural unit is composed of $sp^2$ hybridized graphite-like structural unit and $sp^3$ hybridized diamond-like structural unit, and the two types of units are connected via a coherent interface.

In the context of the present disclosure, the term "basic structural unit" should be understood to refer to the basic structure or main constituent unit of a material, which accounts for at least 70% (e.g. 75%), preferably at least 80% (e.g. 85%), and more preferably at least 90% (e.g. 95% or 99%) of the total weight of the material.

Gradia BN as disclosed herein is a novel $sp^2$-$sp^3$ hybrid crystalline boron nitride allotrope having a structure completely different from other known crystalline boron nitrides. The basic structure of Gradia BN are composed of $sp^2$ hybridized graphite-like structural units and $sp^3$ hybridized diamond-like structural units. Its crystal structure may vary with the widths and/or crystallographic orientation relationships of the internal $sp^2$ and/or $sp^3$ structural units. In particular, the $sp^3$ hybridized diamond-like structural units may be cubic-diamond-like structural units or hexagonal-diamond-like structural units. In addition, according to the needs of specific application scenarios, the molar ratio of the $sp^2$ hybridized graphite-like structural units to the $sp^3$ hybridized diamond-like structural units may vary within a broad range, e.g. from 1:9 to 9:1, from 2:8 to 8:2, from 3:7 to 7:3, from 4:6 to 6:4 or about 5:5, and can be adjusted by controlling/adjusting the synthesis parameters for the material, e.g. the temperature and pressure.

The present disclosure further provides a process for the preparation of Gradia BN, comprising subjecting a boron nitride material to high-temperature and high-pressure treatment.

Some preferred embodiments of the process for the preparation of Gradia BN comprises the steps of:

(1) Loading a boron nitride raw material into a pre-pressing mold, pre-forming the boron nitride raw material into a body by using a press, and then placing it in a vacuum hot-pressing sintering furnace for pre-sintering;

(2) Putting the pre-sintered boron nitride raw material body as obtained in step (1) into an assembly block, and then drying the assembly block containing the boron nitride raw material body (e.g. by putting the assembly block containing the boron nitride raw material body into a drying box);

(3) Placing the assembly block as obtained in step (2) in a press for high-temperature and high-pressure treatment, optionally after it is cooled;

(4) Taking out the assembly block from the press to obtain the $sp^2$-$sp^3$ hybrid crystalline boron nitride after a pressure relief and cooling.

In preferred embodiments, the boron nitride raw material may be $sp^2$ hybridized boron nitride materials or $sp^3$ hybridized boron nitride materials. The $sp^2$ hybridized boron nitride materials may comprise any one or several of $sp^2$ hybridized boron nitride materials, such as hexagonal boron nitride (hBN) with graphite like structure, rhombohedral boron nitride (rBN), disordered boron nitride (pBN and tBN), graphene-like boron nitride (BN monolayer or nanomesh), boron nitride nanotubes (BN nanotubes), onion boron nitride (oBN), amorphous boron nitride (aBN) and other boron nitride materials containing $sp^2$ hybridization. The $sp^3$ hybridized boron nitride materials may comprise any one or several of $sp^3$ hybridized boron nitride materials such as sphalerite boron nitride (cBN) and wurtzite boron nitride (wBN). The boron nitride raw materials may also be a mixture of $sp^2$ hybridized boron nitride materials and $sp^3$ hybridized boron nitride materials.

In addition, it is desirable to wash the raw materials with a dilute acid solution to remove the impurities present therein, such as silicon (Si), oxygen (O), iron (Fe), aluminum (Al), hydrogen (H), and the like, as to achieve Gradia BN products with superior properties. The washed materials need to be cleaned and dried before being loaded into the pre-pressing mold.

In preferred embodiments, the pre-sintering step of step (1) is carried out at a temperature of 200-1800° C. for a period of 5-60 minutes.

In preferred embodiments, the pre-formed body of step (1) is a cylinder.

In preferred embodiments, the drying step of step (2) is carried out at a temperature of 100-200° C. for 1-3 h.

In preferred embodiments, the high-temperature and high-pressure treatment of step (3) is carried out at a pressure of 3-25 GPa (e.g. from 4 GPa, 5 GPa, 6 GPa, 7 GPa, 8 GPa, 9 GPa, 10 GPa, 11 GPa or 12 GPa to 16 GPa, 17 GPa, 18 GPa, 19 GPa, 20 GPa, 21 GPa, 22 GPa, 23 GPa or 24 GPa) and a temperature of 600-2500° C. (e.g. from 650° C., 700° C., 750° C., 800° C., 850° C. or 900° C. to 1000° C., 1200° C., 1400° C., 1600° C., 1800° C., 2000° C., 2200° C. or 2400° C.). The high-temperature and high-pressure treatment of step (3) is usually to pressurize first, then heat up, and then keep the pressure and temperature for a period of holding time. The holding time is not critical and may be determined according to the selected pressure and temperature. The holding time is preferably about 5-120 minutes, e.g. 10-100 minutes or 20-60 minutes. The high-temperature and high-pressure treatment of step (3) may be carried out in an apparatus e.g. (but not limited to) T25 type press supplied by Rockland Research (USA).

In preferred embodiments, the novel $sp^2$-$sp^3$ hybrid crystalline boron nitride material synthesized by the above preparation process has a crystal structure variable with the changes of the internal $sp^2$-hybridized graphite-like structural unit and $sp^3$-hybridized diamond-like structural unit. In particular, the crystal structure of the novel $sp^2$-$sp^3$ hybrid boron nitride can vary with the widths and/or crystallographic orientation relationships of the internal $sp^2$ and $sp^3$ structural units, which can be controlled by e.g. changing the raw materials used and adjusting the synthesis pressure and temperature used in the preparation process.

In a particularly preferred embodiment, the present disclosure discloses a process for preparing Gradia BN, comprising the following steps:

(1) loading one or more boron nitride raw materials, including e.g. $sp^2$ hybridized boron nitride materials such as hBN, rBN, BN nanotubes, aBN or oBN, into a pre-pressing mold, pre-forming the raw boron nitride materials into a cylinder raw material body by using a press, and then placing it in a vacuum hot-pressing sintering furnace for pre-sintering, wherein the pre-sintering is carried out at a temperature of 200-1800° C. and a pressure of 20-50 MPa for a period of 5-60 min;

(2) Putting the pre-sintered boron nitride raw material body as obtained in step (1) into an assembly block, and then putting the assembly block containing the boron nitride raw material body into a drying box for drying wherein the drying is carried out at a temperature of 100-200° C. for 1-3 h;

(3) Taking out the assembly block of step (2) and cooling it to room temperature, and then placing it in a T25 type press supplied by Rockland Research (USA) for high-temperature and high-pressure treatment, wherein the high-temperature and high-pressure treatment is carried out at a pressure of 3-25 GPa and a temperature of 600-2500° C. for a holding time of 5-120 min;

(4) After the press is cooled and depressurized, taking out the assembly block from the press and disassembling the assembly block around the sintered body sample to obtain a novel $sp^2$-$sp^3$ hybrid crystalline boron nitride, i.e. Gradia BN.

Figure 1:
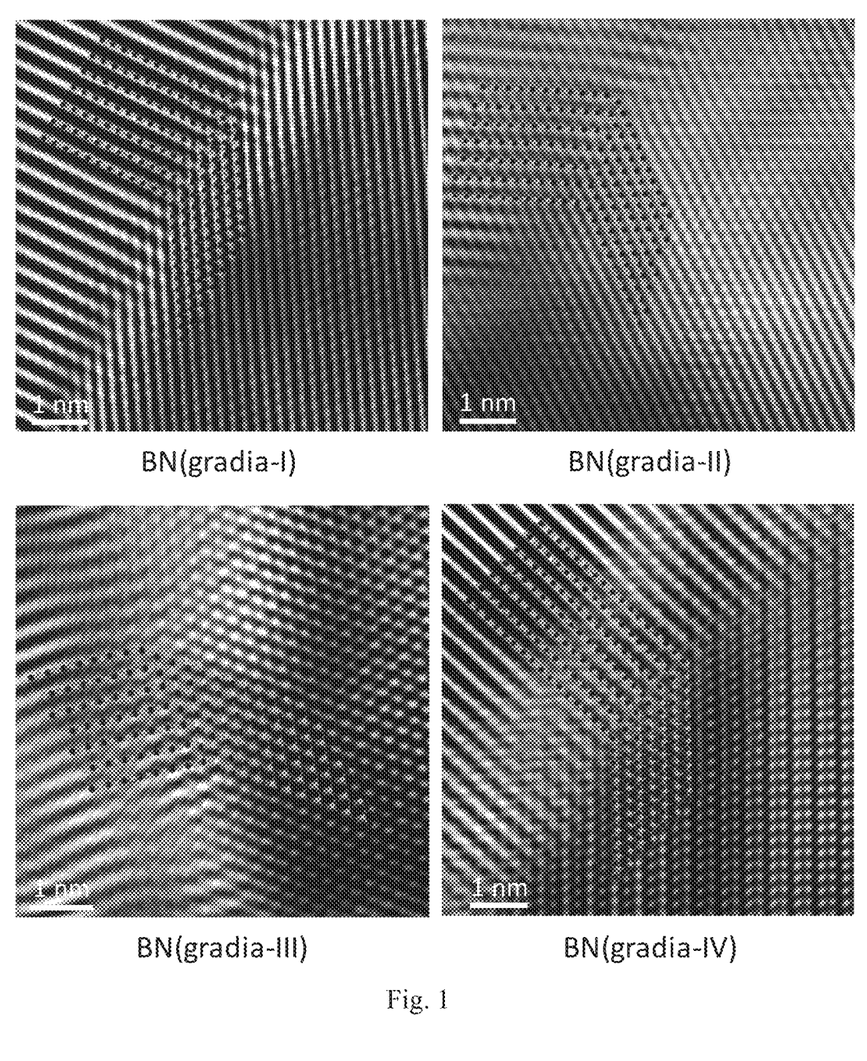
FIG. 1 shows the high-resolution TEM images of four typical types of Gradia BN, wherein the dark spheres represent N atoms and the light spheres represent B atoms.
Figure 4:
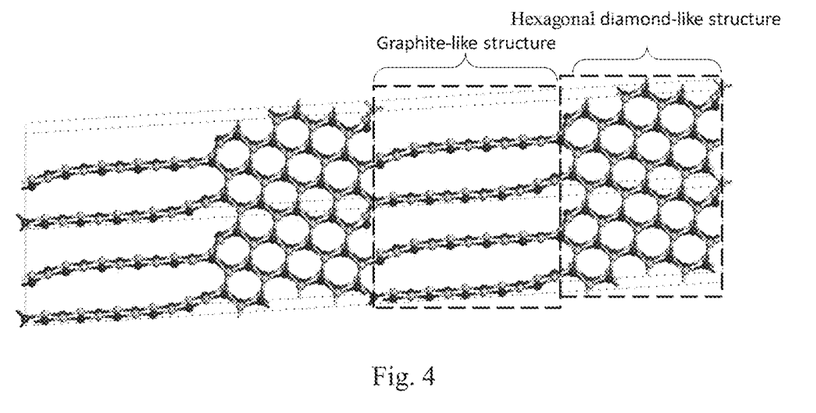
FIG. 4 shows the crystal structure of Gradia-III containing 48 BN formula units per unit cell, according to the present disclosure.
Figure 5:
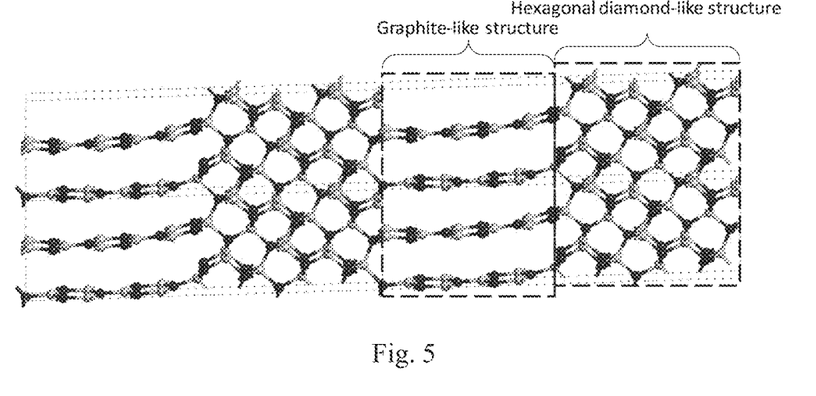
FIG. 5 shows the crystal structure of Gradia-IV containing 24 BN formula units per unit cell, according to the present disclosure.
Figure 6:
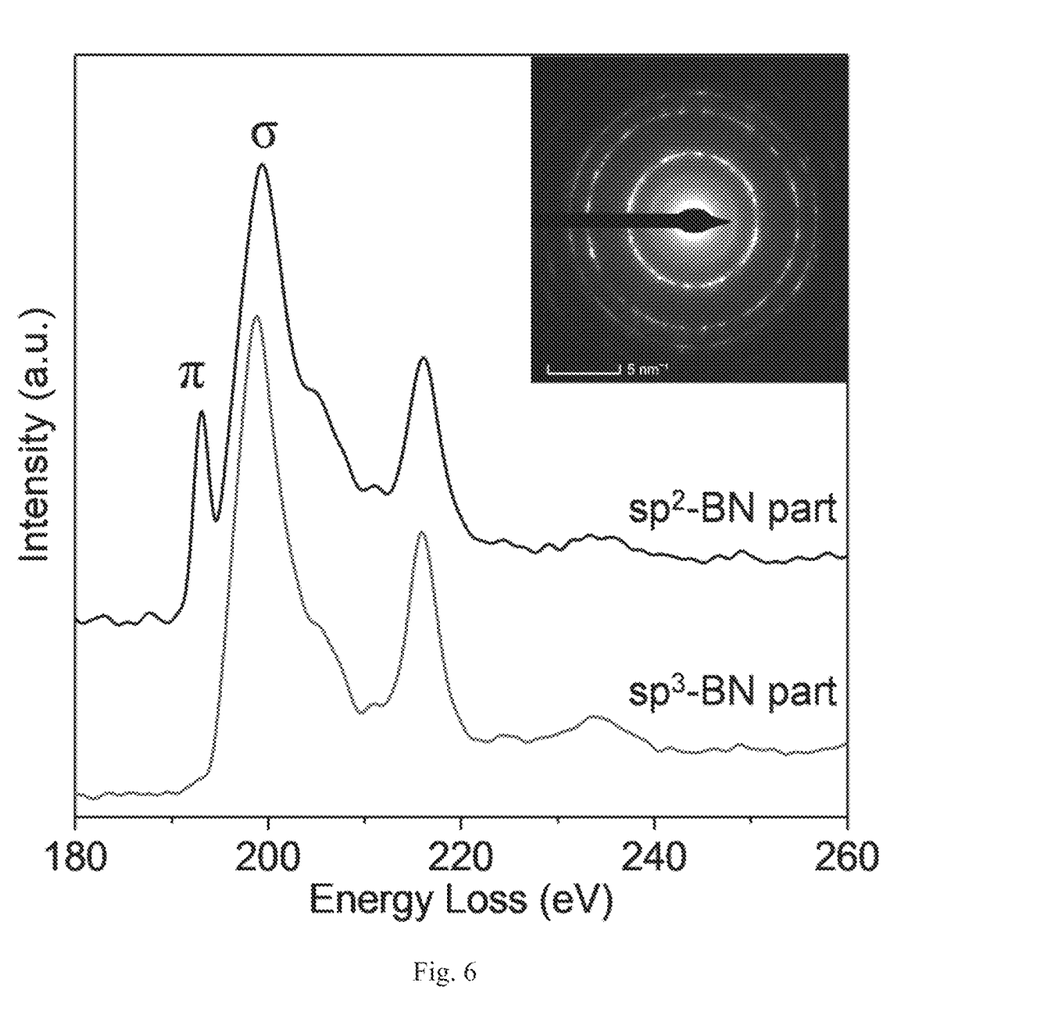
FIG. 6 shows an electron energy loss spectrum (EELS) and a selected area electron diffraction (SAED) pattern of Gradia BN, a novel $sp^2$-$sp^3$ hybrid crystalline boron nitride allotrope prepared in accordance with Example 1 of the present disclosure, as measured by Themis Z transmission electron microscope.

The inventors have prepared a lot of Gradia BN samples by adjusting the synthesis parameters involved in the preparation process. Further investigations show that the Gradia boron nitride samples as obtained can be a single crystal or a polycrystalline form, and their crystal structures may have four kinds of basic configurations. The $sp^2$-$sp^3$ hybrid Gradia BN samples have been observed by Themis Z transmission electron microscope, and the typical results are shown in FIG. 1 and FIG. 6. As shown in the EELS spectra in FIG. 6, Gradia BN has both $sp^2$ hybridization and $sp^3$ hybridization. It can be seen from the high-resolution images in FIG. 1 that the new $sp^2$-$sp^3$ hybrid Gradia boron nitride prepared according to the present disclosure has both $sp^2$ hybridized graphite-like structure unit and $sp^3$ hybridized diamond-like structure unit, and may have four kinds of basic configurations depending on the different interface matching relationship. In each configuration, the size of the internal $sp^2$ hybridized graphite-like structure unit and the size of the internal $sp^3$ hybridized diamond-like structure unit may change. As shown in FIG. 2 to FIG. 5, there are four monoclinic crystal structures found in the samples prepared according to the present disclosure, which are respectively named as Gradia-I BN, Gradia-II BN, Gradia-III BN and Gradia-IV BN.

Figure 2:
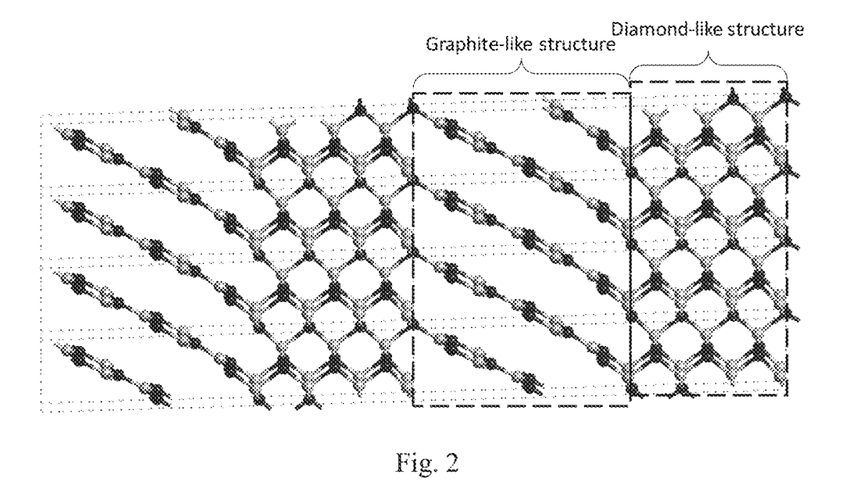
FIG. 2 shows the crystal structure of Gradia-I BN containing 12 BN formula units per unit cell, according to the present disclosure.

The space group of Gradia-I BN is 6 (Pm) or 8 (Cm) depending on the sizes of its internal $sp^2$ and $sp^3$ structural units. The Gradia-I BN with space group of 6 (Pm) is shown in FIG. 2. Taking a crystal structure with 12 BN formula units per unit cell as an example, its lattice constants are a=3.6216 Å, b=2.5161 Å, c=18.5246 Å, R=91.7313°. As seen from FIG. 2, Gradia-I BN is a novel $sp^2$-$sp^3$ hybrid crystalline boron nitride formed by graphite-like structural unit (left part) and cubic-diamond-like structural unit (right part) connected with a specific coherent interface. Gradia BN with this type of coherent interface as shown in FIG. 2 belongs to Gradia-I BN with space group of 6 (Pm) or 8 (Cm).

Figure 3:
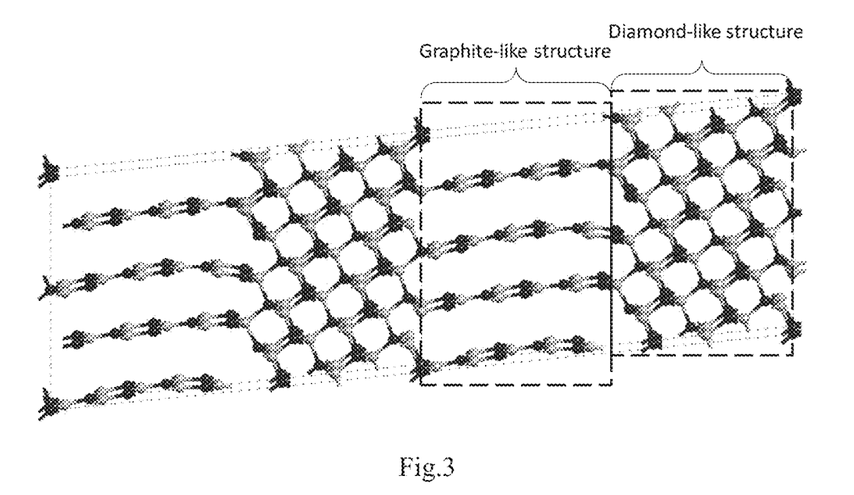
FIG. 3 shows the crystal structure of Gradia-II containing 24 BN formula units per unit cell, according to the present disclosure.

The space group of Gradia-II BN is 8 (Cm). As shown in FIG. 3, taking a crystal structure with 24 BN formula units per unit cell as an example, its lattice constants are a=13.0068 Å, b=2.5152 Å, c=20.5419 Å, β=95.966°. As seen from FIG. 3, Gradia-II BN is a novel $sp^2$-$sp^3$ hybrid crystalline boron nitride formed by graphite-like structural unit (left part) and cubic-diamond-like structural unit (right part) connected with a specific coherent interface. Gradia BN with this type of coherent interface as shown in FIG. 3 belongs to Gradia-II BN with space group of 8 (Cm).

The space group of Gradia-III BN is 4 ($P2_1$). As shown in FIG. 4, taking a crystal structure with 48 BN formula units per unit cell as an example, its lattice constants are a=6.735799 Å, b=4.23985 Å, c=24.038511 Å, β=93.6611°. As seen from FIG. 4, Gradia-III BN is a novel $sp^2$-$sp^3$ hybrid crystalline boron nitride formed by graphite-like structural unit (left part) and hexagonal-diamond-like structural unit (right part) connected with a specific coherent interface. Gradia BN with this type of coherent interface as shown in FIG. 4 belongs to Gradia-III BN with space group of 4 ($P2_1$).

The space group of Gradia-IV BN is 6 (Pm). As shown in FIG. 5, taking a crystal structure with 24 BN formula units per unit cell as an example, its lattice constants are a=6.0502 Å, b=2.5089 Å, c=21.1643 Å, β=91.8807°. As seen from FIG. 5, Gradia-IV BN is a novel $sp^2$-$sp^3$ hybrid crystalline boron nitride formed by graphite-like structural unit (left part) and hexagonal-diamond-like structural unit (right part) connected with a specific coherent interface. Gradia BN with this type of coherent interface as shown in FIG. 5 belongs to Gradia-IV BN with space group of 6 (Pm).

Therefore, Gradia BN as disclosed in the present disclosure may be a monocrystal with a space group of 4 ($P2_1$) or 6 (Pm) or 8 (Cm) or a polycrystal composed of two or more different phases, each of which phases having a space group of 4 ($P2_1$) or 6 (Pm) or 8 (Cm).

EXAMPLES

The raw materials used in the examples were all commercially available $sp^2$ or $sp^3$ hybridized boron nitride materials, including $sp^2$ hybridized boron nitride materials such as hBN, rBN, pBN, tBN, BN monolayer or nanomesh, BN nanotubes, oBN, and aBN, and $sp^3$ hybridized boron nitride materials such as cBN and wBN.

For the high-temperature and high-pressure treatments in the examples, a T25 type press supplied by Rockland Research (USA) was used, and the synthesis pressure and temperature ranges were 3-25 GPa and 25-2500° C., respectively. However, it should be noted that high-temperature and high-pressure equipment involved in the present disclosure is not limited to the T25 type press, and other high-pressure equipment capable of achieving the corresponding pressure and temperature conditions are likewise suitable for the preparation of Gradia BN.

Example 1: Preparation of Gradia BN Using hBN as Boron Nitride Raw Material (1) The raw material hBN was filled into a pre-pressing mold, and the pre-pressing process was carried out at a pressure of 40 MPa for about 5 minutes using a press to obtain a cylinder body. Then, it was placed into a vacuum hot-pressing sintering furnace for pre-sintering, wherein the pre-sintering temperature was set at 1500° C. and the pre-sintering time was about 40 min.

(2) The pre-sintered boron nitride raw material body as obtained in step (1) was put into an assembly block, and then the assembly block containing the boron nitride raw material body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 15 GPa, the synthesis temperature was 900° C. and the holding time was 120 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope and the results are shown in FIG. 6. The selected area electron diffraction (SAED) result demonstrates that the synthesized Gradia BN is a boron nitride material having a novel structure; and the electron energy loss spectrum (EELS) result demonstrates that it is an $sp^2$-$sp^3$ hybrid boron nitride (see FIG. 6). The high resolution transmission electron microscopy image demonstrates that its structural unit is composed of graphite-like structural unit and diamond-like structural unit (see FIG. 1). The crystallographic analysis shows that the sample as obtained contains Gradia-III BN and Gradia-IV BN.

Example 2: Preparation of Gradia BN Using $Sp^2$ Hybridized Boron Nitride Nanotubes as Boron Nitride Raw Material (1) BN nanotubes were filled into a pre-pressing mold, and the pre-pressing process was carried out at a pressure of 30 MPa for about 10 minutes using a press to obtain a cylinder body. Then, it was placed into a vacuum hot-pressing sintering furnace for pre-sintering, wherein the pre-sintering temperature was set at 1400° C. and the pre-sintering time was about 15-20 min.

(2) The pre-sintered boron nitride nanotubes body as obtained in step (1) was put into an assembly block, and then the assembly block containing the boron nitride nanotubes body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 20 GPa, the synthesis temperature was 1200° C. and the holding time was 30 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit (see FIG. 1). The crystallographic analysis shows that the sample as obtained contains Gradia-I BN and Gradia-II BN.

Example 3: Preparation of Gradia BN Using Onion BN (oBN) as Boron Nitride Raw Material (1) The raw material oBN was filled into a pre-pressing mold, and the pre-pressing process was carried out at a pressure of 50 MPa for about 15 minutes using a press to obtain a cylinder body.

(2) The boron nitride raw material body as obtained in step (1) was put into an assembly block, and then the assembly block containing the boron nitride raw material body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 18 GPa, the synthesis temperature was 1800° C. and the holding time was 60 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit (see FIG. 1). The crystallographic analysis shows that the sample as obtained contains Gradia-I BN, Gradia-II BN, Gradia III-BN, and Gradia-IV BN.

Example 4: Preparation of Gradia BN Using Onion BN (oBN) as Boron Nitride Raw Material The steps (1) to (4) of Example 3 were repeated except that in step (3) the synthesis pressure was 20 GPa and the synthesis temperature was 800° C.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit (see FIG. 1). The crystallographic analysis shows that the sample as obtained contains Gradia-I BN (with a space group of 6 (Pm) or 8 (Cm)), Gradia-II BN (with a space group of 8 (Cm)), Gradia III-BN (with a space group of 4 ($P2_1$)) and Gradia-IV BN (with a space group of 6 (Pm)).

Example 5: Preparation of Gradia BN Using hBN as Boron Nitride Raw Material (1) The raw material hBN was put into dilute hydrochloric acid solution to remove impurities. Then, after hBN was separated from the acid solution, it was rinsed by methanol for several times. The rinsed hBN was then dried, affording the purified hBN raw material. Then, the purified hBN was filled into a pre-pressing mold, and the pre-pressing process was carried out at a pressure of 20 MPa for about 5 minutes using a press to obtain a cylinder body. Then, it was placed into a vacuum hot-pressing sintering furnace for pre-sintering, wherein the pre-sintering temperature was set at 1200° C., the pre-sintering pressure was set at 30 MPa and the pre-sintering time was about 20 min.

(2) The pre-sintered boron nitride raw material body as obtained in step (1) was put into an assembly block, and then the assembly block containing the boron nitride raw material body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 15 GPa, the synthesis temperature was 1000° C. and the holding time was 60 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit (see FIG. 1). The crystallographic analysis shows that the sample as obtained contains Gradia-I BN (with a space group of 6 (Pm) or 8 (Cm)) and Gradia-II BN (with a space group of 8 (Cm)).

Example 6: Preparation of Gradia BN Using cBN as Boron Nitride Raw Material (1) The raw material cBN powders were pretreated by purification and vacuum heating to remove the impurities such as adsorbed oxygen, adsorbed water and bound water. In particular, the purification was carried out by acid dissolution. Then, the purified cBN powders were filled into the mold of a vacuum hot pressing furnace for further treatment, wherein the vacuum degree was below $5\times10^{-2}$, the temperature was 1600° C., the pressure was 30 MPa and the holding time was 15 min.

(2) The pre-sintered boron nitride raw material body as obtained in step (1) was put into an assembly block, and then the assembly block containing the boron nitride raw material body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 8 GPa, the synthesis temperature was 2000° C. and the holding time was 30 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit.

Example 7: Preparation of Gradia BN Using cBN as Boron Nitride Raw Material

The steps (1)-(4) of Example 5 were repeated except that cBN was used as the boron nitride raw material and in step (3) the synthesis pressure was 6 GPa and the synthesis temperature was 1700° C.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^a$ hybrid boron nitride. The high resolution transmission electron microscopy image demonstrates that its structural unit is composed of graphite-like structural unit and diamond-like structural unit. The crystallographic analysis shows that the sample as obtained contains Gradia-I BN (with a space group of 6 (Pm) or 8 (Cm)) and Gradia-II BN (with a space group of 8 (Cm)).

Figure 7:
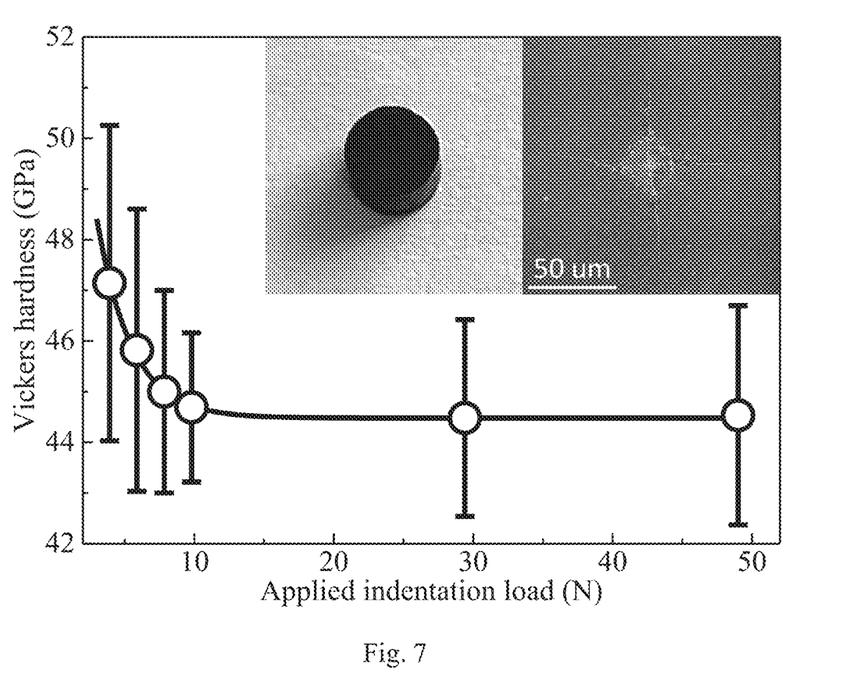
FIG. 7 shows the Vickers hardness data and photograph of a Gradia BN sample prepared in accordance with Example 7 of the present disclosure as well as a photograph of indentation obtained from the Vickers hardness test under 5 Kg load.

The product as obtained was further tested by KB-5 BVZ micro-hardness tester and the Vickers hardness test results are shown in FIG. 7. As shown in FIG. 7, the asymptote hardness is about 45 GPa and the maximum hardness is about 50 GPa. FIG. 7 also shows a photograph of the Gradia BN block sample prepared in accordance with Example 7 and a photograph of indentation obtained from the Vickers hardness test under 5 Kg load. By measuring the crack length of the indentation, the fracture toughness of the sample is calculated to be 8-10 $MPa \cdot M^{1/2}$.

Example 8: Preparation of Gradia BN Using $Sp^2$ Hybridized hBN as Boron Nitride Raw Material (1) The raw material hBN was put into dilute hydrochloric acid solution to remove impurities. Then, after hBN was separated from the acid solution, it was rinsed by methanol for several times. The rinsed hBN was then dried, affording the purified hBN raw material. Then, the purified hBN was filled into a pre-pressing mold, and the pre-pressing process was carried out at a pressure of 20 MPa for about 5 minutes using a press to obtain a cylinder body. Then, it was placed into a vacuum hot-pressing sintering furnace for pre-sintering, wherein the pre-sintering temperature was set at 1200° C., the pre-sintering pressure was set at 30 MPa and the pre-sintering time was about 20 min.

(2) The pre-sintered boron nitride raw material body as obtained in step (1) was put into an assembly block, and then the assembly block containing the boron nitride raw material body was put into a drying box for drying wherein the drying temperature was 180° C. and the drying time was 2 h.

(3) The assembly block as obtained in step (2) was taken out from the drying box and allowed to cool, and then was placed into a T25 type press supplied by Rockland Research (USA) for high-temperature and high-pressure treatment, wherein the synthesis pressure was 10 GPa, the synthesis temperature was 1000° C. and the holding time was 60 min. Then, the press was cooled and depressurized.

(4) The assembly block was taken out from the press, thereby a novel $sp^2$-$sp^3$ hybrid crystalline boron nitride, i.e. Gradia BN, was obtained.

The obtained product was observed and analyzed through Themis Z transmission electron microscope. The SAED and EELS results are similar to those shown in FIG. 6. The SAED result demonstrates that the synthesized Gradia BN is a boron nitride material having a novel structure; and the EELS result demonstrates that it is an $sp^2$-$sp^3$ hybrid boron nitride. The high resolution transmission electron microscopy image demonstrates that its structural unit is composed of graphite-like structural unit and diamond-like structural unit (see FIG. 1). The crystallographic analysis shows that the sample as obtained contains Gradia-I BN (with a space group of 6 (Pm) or 8 (Cm)), Gradia-II BN (with a space group of 8 (Cm)), and Gradia-IV BN (with a space group of 6 (Pm)).

Certain embodiments are described herein, including preferred embodiments known to the inventors, but the scope of the present disclosure is not limited to these embodiments. Of course, equivalent variations on these described embodiments based on structure, shape, principle and the like will become apparent to those of ordinary skill in the art upon reading the foregoing description and will be covered by the scope of the attached claims.

The present disclosure enumerates alternative materials for each component. It is to be understood that the recited list serves only as a representative group and should not be interpreted as an exclusive list. Other materials not mentioned in the disclosure may be used for achieving the purpose of the present disclosure. The embodiments disclosed herein are illustrative of the principles of the embodiments. Thus, by way of example, but not of limitation, alternative embodiments may be utilized in accordance with the teachings herein.

Where a numerical range is disclosed herein, then such a range is continuous, inclusive of both the minimum and maximum values of the range, as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include any and all subranges between the minimum value of 1 and the maximum value of 10. In addition, every point or individual disclosed herein value may serve as a lower or upper limit combined with any other point or individual value or any other lower or upper limit disclosed herein, to form a range not explicitly recited herein, which range will be covered by the protection scope of the attached claims. Moreover, any combination of the above-described elements in all possible variations thereof is contemplated as falling into the protection scope of the attached claims.

In addition, as used herein, the articles "a", "an" and "the" may include plural referents unless otherwise expressly limited to one-referent, or if it would be obvious to a skilled artisan from the context of the sentence that the article referred to a singular referent.

The invention claimed is:

1. An $sp^2$-$sp^3$ hybrid crystalline boron nitride, wherein its basic structural unit is composed of $sp^2$ hybridized graphite-like structural unit and $sp^3$ hybridized diamond-like structural unit, and wherein the sp2 hybridized graphite-like structural unit and the sp3 hybridized diamond-like structural unit are connected via a coherent interface.

2. The $sp^2$-$sp^3$ hybrid crystalline boron nitride according to claim 1, being a monocrystal with a space group of 4 ($P2_1$) or 6 (Pm) or 8 (Cm) or a polycrystal composed of two or more different phases, each of which phases having a space group of 4 ($P2_1$) or 6 (Pm) or 8 (Cm).

3. A process for the preparation of the $sp^2$-$sp^3$ hybrid crystalline boron nitride as defined in claim 1, comprising the steps of:
   (1) loading the boron nitride raw material into a pre-pressing mold, pre-forming the boron nitride raw material into a body by using a press, and then placing it in a vacuum hot-pressing sintering furnace for pre-sintering;
   (2) putting the pre-sintered boron nitride raw material body as obtained in step (1) into an assembly block, and then drying the assembly block containing the pre-sintered boron nitride raw material body;
   (3) placing the assembly block as obtained in step (2) in a press and subjecting it to high-temperature and high-pressure treatment; and
   (4) taking out the assembly block from the press to obtain the $sp^2$-$sp^3$ hybrid crystalline boron nitride after a pressure relief and cooling.

4. The process for the preparation of the $sp^2$-$sp^3$ hybrid crystalline boron nitride according to claim 3, wherein step (1) further comprises purifying the boron nitride raw material by an acid solution to remove impurities, cleaning it using methanol and then drying it before it is loaded into the pre-pressing mold.

5. The process for the preparation of the $sp^2$-$sp^3$ hybrid crystalline boron nitride according to claim 4, wherein the high-temperature and high-pressure treatment of step (3) is carried out at a pressure of 3-25 GPa and a temperature of 600-2500° C. for a period of 5-120 minutes.

6. The process for the preparation of the $sp^2$-$sp^3$ hybrid crystalline boron nitride according to claim 5, wherein the boron nitride raw material is one or more $sp^2$ hybridized boron nitride materials selected from the group consisting of hexagonal boron nitride (hBN), rhombohedral boron nitride (rBN), disordered boron nitride (pBN and tBN), graphene-like boron nitride (BN monolayer or nanomesh), boron nitride nanotubes (BN nanotubes), onion boron nitride (oBN) and amorphous boron nitride (aBN), one or more $sp^3$ hybridized boron nitride materials selected from the group consisting of sphalerite boron nitride (cBN) and wurtzite boron nitride (wBN), or a mixture of $sp^2$ hybridized boron nitride materials and $sp^3$ hybridized boron nitride materials.

7. The process for the preparation of the $sp^2$-$sp^3$ hybrid crystalline boron nitride according to claim 4, wherein the boron nitride raw material is one or more $sp^2$ hybridized boron nitride materials selected from the group consisting of hexagonal boron nitride (hBN), rhombohedral boron nitride (rBN), disordered boron nitride (pBN and tBN), graphene-like boron nitride (BN monolayer or nanomesh), boron nitride nanotubes (BN nanotubes), onion boron nitride (oBN) and amorphous boron nitride (aBN), one or more sp$^3$ hybridized boron nitride materials selected from the group consisting of sphalerite boron nitride (cBN) and wurtzite boron nitride (wBN), or a mixture of sp$^2$ hybridized boron nitride materials and sp$^3$ hybridized boron nitride materials.

8. The process for the preparation of the sp$^2$-sp$^3$ hybrid crystalline boron nitride according to claim 3, wherein the pre-sintering step of step (1) is carried out at a temperature of 200-1800° C. for a period of 5-60 minutes.

9. The process for the preparation of the sp$^2$-sp$^3$ hybrid crystalline boron nitride according to claim 3, wherein the drying step of step (2) is carried out at a temperature of 100-200° C. for 1-3 h.

10. The process for the preparation of the sp$^2$-sp$^3$ hybrid crystalline boron nitride according to claim 3, wherein the high-temperature and high-pressure treatment is carried out at a pressure of 3-25 GPa and a temperature of 600-2500° C. for a period of 5-120 minutes.

11. The process for the preparation of the sp$^2$-sp$^3$ hybrid crystalline boron nitride according to claim 10, wherein the boron nitride raw material is one or more sp$^2$ hybridized boron nitride materials selected from the group consisting of hexagonal boron nitride (hBN), rhombohedral boron nitride (rBN), disordered boron nitride (pBN and tBN), graphene-like boron nitride (BN monolayer or nanomesh), boron nitride nanotubes (BN nanotubes), onion boron nitride (oBN) and amorphous boron nitride (aBN), one or more sp$^3$ hybridized boron nitride materials selected from the group consisting of sphalerite boron nitride (cBN) and wurtzite boron nitride (wBN), or a mixture of sp$^2$ hybridized boron nitride materials and sp$^3$ hybridized boron nitride materials.

12. The process for the preparation of the sp$^2$-sp$^3$ hybrid crystalline boron nitride according to claim 3, wherein the boron nitride raw material is one or more sp$^2$ hybridized boron nitride materials selected from the group consisting of hexagonal boron nitride (hBN), rhombohedral boron nitride (rBN), disordered boron nitride (pBN and tBN), graphene-like boron nitride (BN monolayer or nanomesh), boron nitride nanotubes (BN nanotubes), onion boron nitride (oBN) and amorphous boron nitride (aBN), one or more sp$^3$ hybridized boron nitride materials selected from the group consisting of sphalerite boron nitride (cBN) and wurtzite boron nitride (wBN), or a mixture of sp$^2$ hybridized boron nitride materials and sp$^3$ hybridized boron nitride materials.

\* \* \* \* \*